US012710164B1

(12) United States Patent
Zhao et al.

(10) Patent No.: US 12,710,164 B1
(45) Date of Patent: Aug. 18, 2026

(54) BRACKET-TYPE SWIMMING POOL LIGHT

(71) Applicant: SICHUAN COOTWAY TECHNOLOGY CO., LTD., Deyang (CN)

(72) Inventors: Chunhai Zhao, Deyang (CN); Daiquan Li, Deyang (CN)

(73) Assignee: SICHUAN COOTWAY TECHNOLOGY CO., LTD., Deyang (CN)

( * ) Notice: Subject to any disclaimer, the term of this patent is extended or adjusted under 35 U.S.C. 154(b) by 0 days.

(21) Appl. No.: 19/402,881

(22) Filed: Nov. 26, 2025

(30) Foreign Application Priority Data

Nov. 5, 2025 (CN) ......................... 202522351202.7

(51) Int. Cl.
*F21V 21/10* (2006.01)
*F21S 9/03* (2006.01)
*F21W 131/401* (2006.01)

(52) U.S. Cl.
CPC .............. *F21V 21/10* (2013.01); *F21S 9/037* (2013.01); *F21W 2131/401* (2013.01)

(58) Field of Classification Search
CPC .... F21V 21/088; F21V 23/0478; F21V 21/10; F21S 9/037; F21S 8/00; F21S 8/33
See application file for complete search history.

(56) References Cited

U.S. PATENT DOCUMENTS

| | | | | |
|---|---|---|---|---|
| 3,955,076 A * | 5/1976 | Shaw | F21S 9/02 362/183 |
| 5,150,962 A * | 9/1992 | Rauschenberger | F21V 33/004 362/802 |
| 5,513,397 A * | 5/1996 | Terry | A47K 17/00 362/802 |
| 12,098,835 B1 | 9/2024 | Shen | |
| 12,313,240 B1 * | 5/2025 | Cao | F21S 9/02 |
| 2015/0259944 A1 | 9/2015 | Mcpeak | |
| 2015/0285475 A1 * | 10/2015 | Perkins | F21V 31/005 362/101 |
| 2015/0338072 A1 * | 11/2015 | Garcia | F21V 31/005 362/101 |
| 2025/0389412 A1 * | 12/2025 | Huang | F21V 21/088 |

FOREIGN PATENT DOCUMENTS

CN 223242694 U 8/2025

* cited by examiner

*Primary Examiner* — Thomas M Sember

(57) ABSTRACT

A bracket-type swimming pool light includes a lamp head assembly and a bracket assembly. The lamp head assembly includes a housing which is at least partially light-transmitting, the housing is provided with a circuit board, at least one light-emitting element, and a battery; the at least one light-emitting element and the battery are electrically connected to the circuit board. The bracket assembly is detachable and connectable to the lamp head assembly, the bracket assembly includes an attachment structure configured to secure the bracket-type swimming pool light to a carrier.

18 Claims, 13 Drawing Sheets

A-A

A-A

B

C-C

BRACKET-TYPE SWIMMING POOL LIGHT

RELATED APPLICATIONS

The present patent document claims the benefit of priority to Chinese Patent Application No. 202522351202.7, filed Nov. 5, 2025, the entire content of which is incorporated herein by reference.

BACKGROUND

1. Technical Field

The present disclosure relates to lighting technology, and in particular to a bracket-type swimming pool light.

2. Background Information

A swimming pool light is a lighting device specifically designed for swimming pools, typically featuring waterproof and corrosion-resistant properties.

BRIEF SUMMARY

The first aspect of the embodiments of the present disclosure provides a bracket-type swimming pool light including: a lamp head assembly and a bracket assembly. The lamp head assembly includes a housing which is at least partially light-transmitting, the housing is provided with a circuit board, at least one light-emitting element, and a battery; the at least one light-emitting element and the battery are electrically connected to the circuit board. The bracket assembly is detachable and connectable to the lamp head assembly, the bracket assembly includes an attachment structure configured to secure the bracket-type swimming pool light to a carrier.

BRIEF DESCRIPTION OF THE DRAWINGS

The drawings in the specification, which constitute a part of the present disclosure, are configured to provide further understanding of the present disclosure. The illustrative embodiments of the present disclosure and their descriptions are for explanation purposes and do not constitute improper limitations on the present disclosure.

DETAILED DESCRIPTION OF THE DRAWINGS AND THE PRESENTLY PREFERRED EMBODIMENTS

Figure 1:
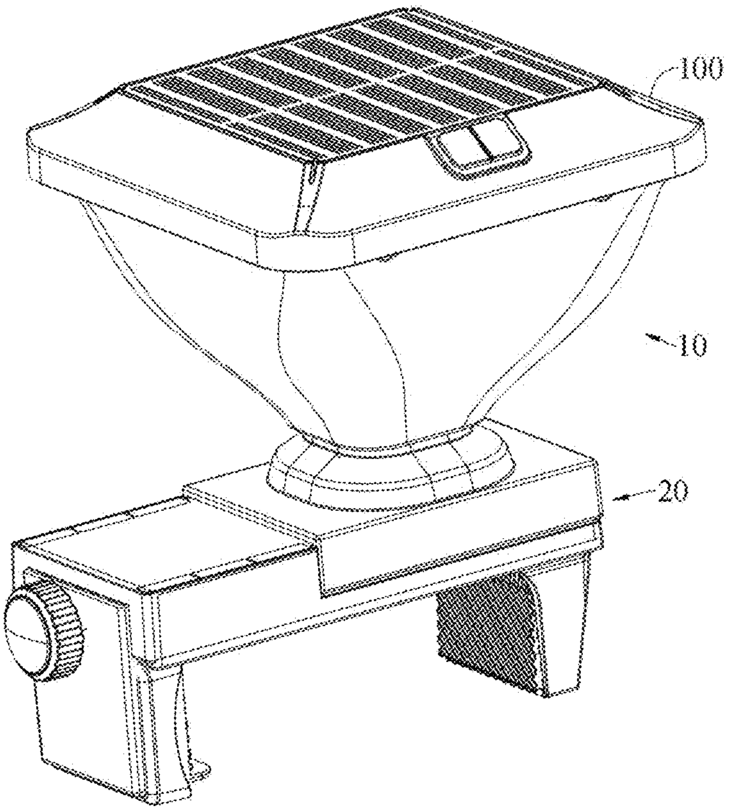
FIG. 1 is a perspective view of a bracket-type swimming pool light according to some embodiments of the present disclosure.

The present disclosure will be described in detail below with reference to the accompanying drawings and in conjunction with examples. Each example is provided by way of explanation of the present disclosure and is not intended to limit the present disclosure. Indeed, those skilled in the art will appreciate that modifications and variations may be made herein without departing from the scope or spirit of the present disclosure. For example, a feature illustrated or described as part of some embodiments may be used in another embodiment to produce yet another embodiment. Therefore, it is intended that the present disclosure encompasses such modifications and variations as come within the scope of the appended claims and their equivalents.

In the description of the present disclosure, terms such as "longitudinal," "transverse," "upper," "lower," "front," "rear," "left," "right," "vertical," "horizontal," "top," and "bottom" indicate orientations or positional relationships based on the orientations or positional relationships shown in the accompanying drawings. These terms are provided solely for ease of description and do not require that the present disclosure be constructed or operated in a specific orientation. Therefore, they should not be construed as limiting the present disclosure. The terms "connected," "connection," and "arranged" used in the present disclosure should be interpreted broadly. For example, they can refer to fixed or detachable connections; direct or indirect connections through intermediate components; wired electrical connections, radio connections, or wireless communication signal connections. Those skilled in the art will understand the specific meanings of these terms based on the specific circumstances.

The accompanying drawings illustrate one or more examples of the present disclosure. The detailed description uses numbers and letters to refer to features in the drawings. Like or similar numbers in the drawings and description have been configured to refer to like or similar parts of the present disclosure. As used herein, the terms "first," "second," and "third" are used interchangeably to distinguish one component from another and are not intended to indicate the location or importance of individual components.

Figure 2:
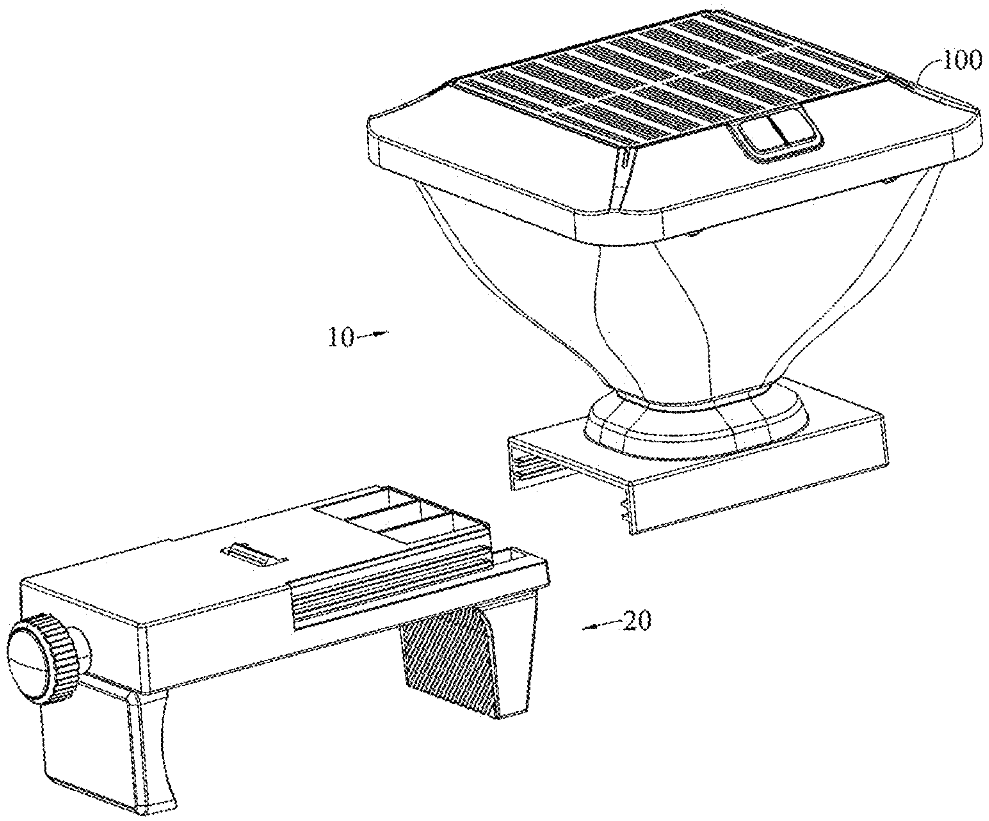
FIG. 2 is a perspective view of a lamp head assembly and a bracket assembly disassembled in an embodiment of the present disclosure.
Figure 3:
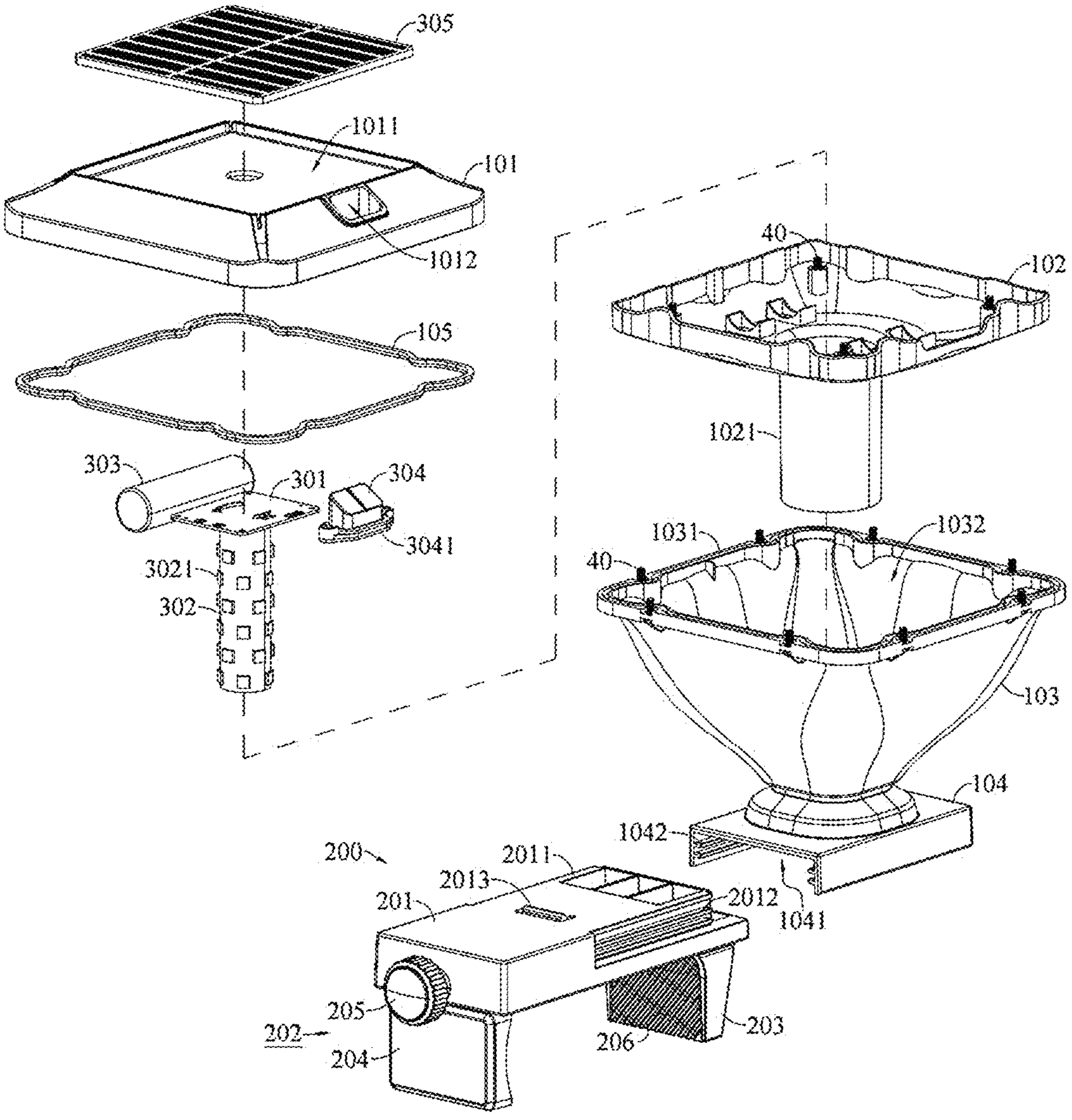
FIG. 3 is an exploded view of the bracket-type swimming pool light shown in FIG. 1.
Figure 4:
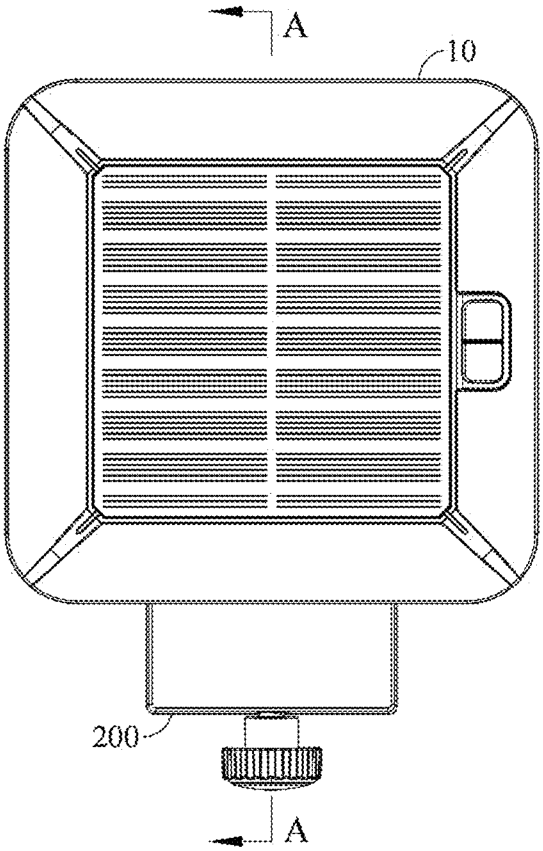
FIG. 4 is another perspective view of FIG. 1.

As shown in FIG. 1, FIG. 2, and FIG. 3, according to some embodiments of the present disclosure, a bracket-type swimming pool light is provided, including a lamp head assembly 10 and a bracket assembly 20, which are selectively detachable and connectable.

The lamp head assembly 10 includes a housing 100, within which a circuit board 301, at least one light-emitting element 3021, and a battery 303 are disposed. Both the light-emitting element 3021 and the battery 303 are electrically connected to the circuit board 301. The circuit board 301 is provided with a power supply circuit. In some embodiments, the at least one light-emitting element 3021 includes a high-brightness LED. The type and parameters of the LED, such as single-color, multi-color, or those with different pin types, can be selected based on the applicable scenario. No specific limitations are made here. In some embodiments, the power supply circuit of the circuit board 301 can provide multiple light-emitting modes, including but not limited to multi-color, dazzling, and flame effects. No specific limitations are made here. The bracket assembly 20 includes a receiving structure for connecting the lamp head assembly 10 and a fixing structure for connecting to the pool. Due to the diverse types of swimming pools, such as above-ground pools, inground pools, inflatable pools, and frame pools, the present disclosure includes various bracket assemblies 20 with fixed-structure to adapt to different types of pools. The lamp head assembly 10 can be connected to a suitable bracket assembly 20 with fixed structure to securely connect to different types of pools, thereby improving the versatility of the bracket-type swimming pool light.

As shown in FIG. 2 to FIG. 5, the housing 100 includes a top housing 101 and a bottom housing 103. The bottom housing 103 defines a chamber 1032 with an opening 1031. The top housing 101 detachably closes the opening 1031, forming a sealed space within the chamber 1032. The sidewalls of the bottom housing 103 are somewhat transparent; for example, the bottom housing 103 may be made of colorless/colored transparent PC material; the bottom housing 103 may also be made of a translucent material. The aforementioned circuit board 301, the at least one light-emitting element 3021, and the battery 303 are all disposed within this sealed space. In some embodiments, the circuit board 301 is fixedly connected to the top housing 101 by a screw 40. A cylindrical lamp panel 302 is provided on the circuit board 301. The lamp panel 302 extends towards the bottom housing 103 within the chamber 1032, and the at least one light-emitting element 3021 is distributed on an outer wall of the lamp panel 302. In some embodiments, the lamp panel 302 is a flexible lamp panel, and the cylindrical structure of the lamp panel 302 is formed by surrounding the flexible lamp panel.

Figure 5:
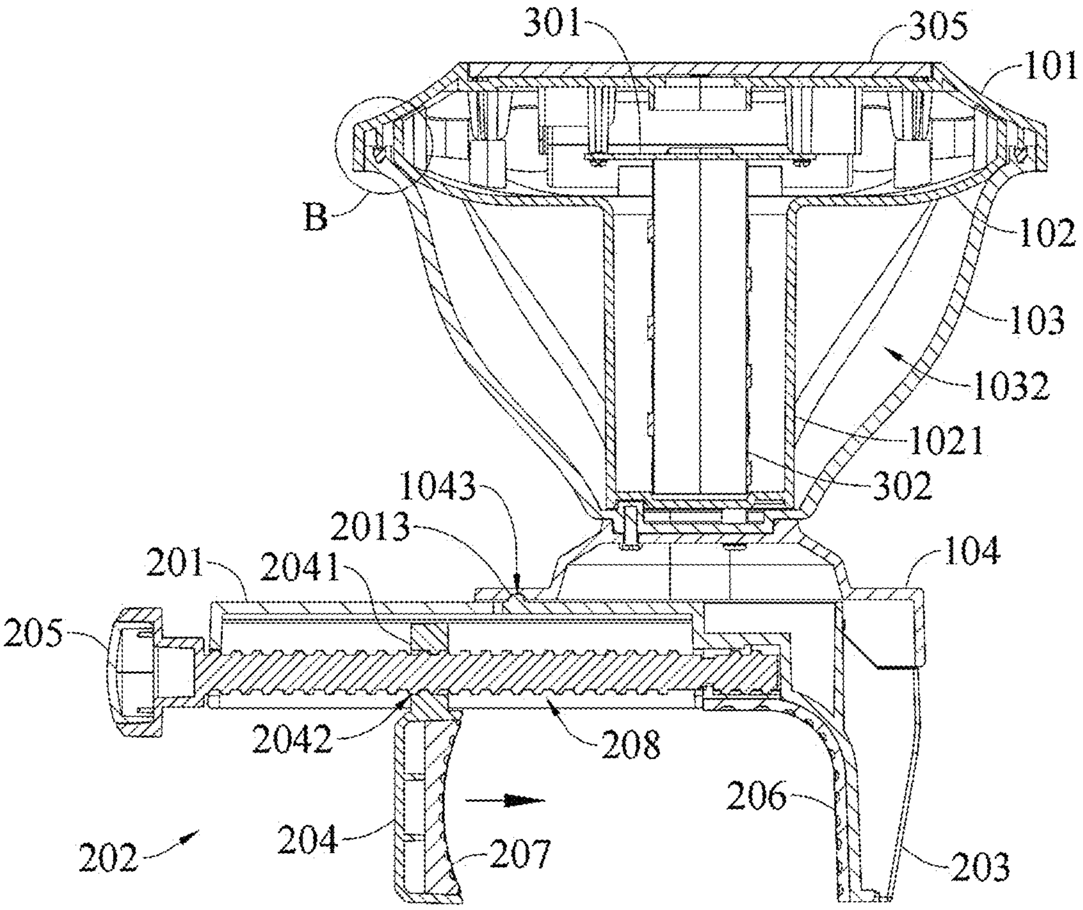
FIG. 5 is a cross-sectional view taken along line AA in FIG. 4.
Figure 6:
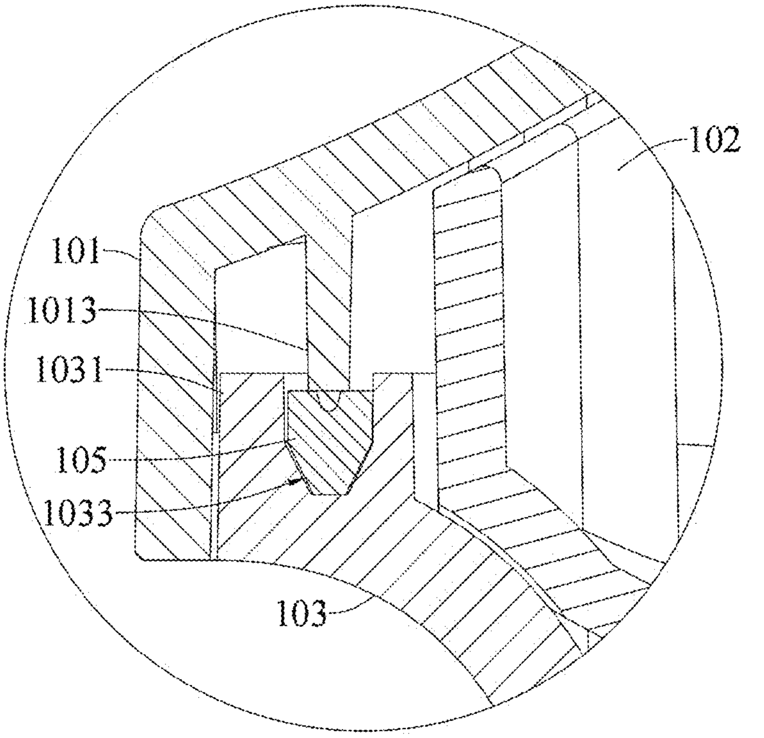
FIG. 6 is a partially enlarged view of area B in FIG. 5.

To ensure the sealing between the top housing 101 and the bottom housing 103, a sealing ring 105 is provided between them. As shown in FIG. 3, FIG. 5, and FIG. 6, in some embodiments, the opening 1031 of the bottom housing 103 defines a sealing groove 1033. The sealing groove 1033 is distributed along an extending direction of an edge of the opening 1031, and the sealing ring 105 is embedded in the sealing groove 1033. An annular protrusion 1013 is provided on a side of the top housing 101 facing the bottom housing 103, and an extending direction of the annular protrusion 1013 is the same as the extending direction of the sealing groove 1033. During the process of securing the top housing 101 and the bottom housing 103 together with the screws 40, the sealing ring 105 gradually and tightly fits the sealing groove 1033 and the annular protrusion 1013.

In some embodiments, a tubular lampshade 1021 is fitted over an outer side of the lamp panel 302. The lampshade 1021 not only protects the lamp panel 302 and enhances its aesthetics but also adjusts the light. For example, in some embodiments, a white lampshade 1021 is configured to make the lighting softer and more uniform.

In some embodiments, the lamp head assembly 10 further includes an inner housing 102, which is disposed within the aforementioned sealed space and divides the sealed space into two regions. The circuit board 301 and the battery 303 are confined within a first region. The lampshade 1021 is disposed within the inner housing 102, and the lampshade 1021 is disposed within a second region and extends towards the bottom housing 103, fitting over the outer side of the lamp panel 302. In some embodiments, the inner housing 102 is fixedly connected to the outer housing 101 by screws 40.

As shown in FIG. 3, according to some embodiments of the present disclosure, a solar panel 305 is provided, which is disposed on the outer housing 101 and electrically connected to the circuit board 301. A power management circuit is installed on the circuit board 301, which can obtain electrical energy through the solar panel 305 and selectively charge the battery 303. This design allows the pool light to charge during the day and provide illumination at night. In some embodiments, a top surface of the housing 101 defines a top groove 1011, in which the solar panel 305 is embedded.

In some embodiments, the lamp head assembly 10 further includes a button 304, which is electrically connected to the circuit board 301 and is configured to control the switching on and off, the lighting effects, etc., of the pool light. The housing 101 defines a through hole 1012 for receiving the button 304. To ensure the pool light's waterproofness, the button 304 has a silicone sleeve. In some embodiments, the button 304 is inserted into the through hole 1012 from the inside of the housing 101 and is fixedly connected to the housing 101 by a screw 40. During the process of fastening the button 304 to the top housing 101, the silicone sleeve on the outside of the button 304 gradually and tightly adheres to the top housing 101.

Figure 7:
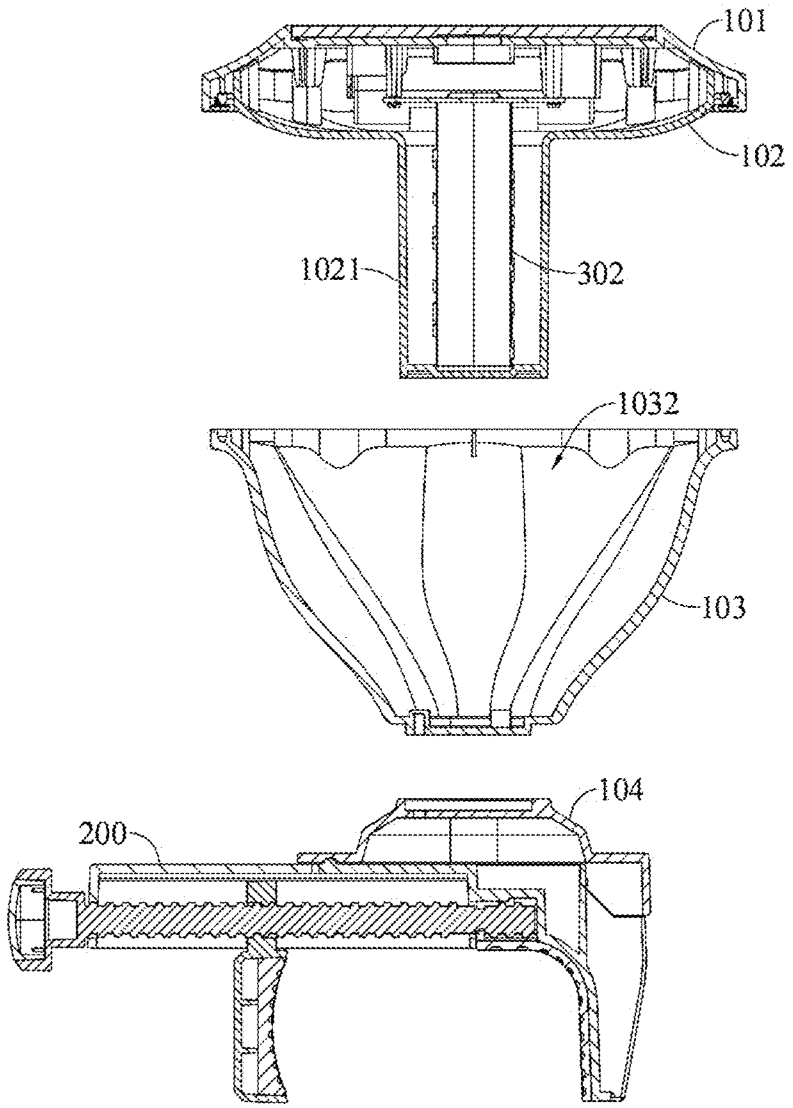
FIG. 7 is an exploded state of FIG. 5.

As shown in FIG. 3, FIG. 5, and FIG. 7, in some embodiments, the bracket assembly 20 includes a first bracket assembly 200, which includes an elongated frame 201. One end of the frame 201 along its longitudinal direction is provided with a receiving portion 2011. The receiving portion 2011 has two sidewalls facing opposite directions, each sidewall being provided with a first guide strip 2012. The bottom housing 103 of the lamp head assembly 10 is provided with a base 104, and the base 104 defines a sliding groove 1041. Two opposing inner walls of the sliding groove 1041 each is provided with a second guide strip 1042. Under the constraint of the first guide strips 2012 and the second guide strips 1042, the base 104 and the receiving portion 2011 can only slide along the guiding directions of the first guide strips 2012 and the second guide strips 1042. The receiving portion 2011 has an outwardly protruded locking body 2013 on its top surface, and the sliding groove 1041 defines a locking slot 1043 that engages with the locking body 2013. When the receiving portion 2011 is inserted into the base 104 at a set position, the locking body 2013 aligns with and engages with the locking slot 1043. In this way, the lamp head assembly 10 is stably mounted on the first bracket assembly 200. For disassembly, the base 104 can be pushed in the opposite direction of insertion to disengage the locking body 2013 from the locking slot 1043.

As shown in FIG. 5 and FIG. 7, in some embodiments, the bottom housing 103 and the base 104 are detachably connected. This allows the base 104 to serve as an intermediate connector, adaptable to different lamp head assemblies 10 or bracket assemblies 20. For example, if the connection structure between the base 104 and the bracket assembly 20 changes, only the base 104 needs to be replaced; other parts of the lamp head assembly 10 do not need to be replaced.

The bracket assembly 20 of the present disclosure has an attachment structure, which allows it to be selectively fixed to a carrier.

In some embodiments, the attachment structure of the first bracket assembly 20 includes a first clamping structure 202. The first clamping structure 202 includes a first clamping member 203 and a second clamping member 204. The first clamping member 203 is fixedly disposed at a first end along a longitudinal direction of the frame 201, and the second clamping member 204 can selectively approach the first clamping member 203 along the longitudinal direction of the frame 201 to achieve a clamping effect. In some embodiments, the frame 201 defines a transverse sliding groove 208 along its longitudinal direction, and a sliding end 2041 of the second clamping member 204 can be slidably connected to the transverse sliding groove 208 along its longitudinal direction. The frame 201 has a rotatable threaded rod 205, and a first end of the threaded rod 205 is inserted into the transverse sliding groove 208 from the second end of the frame 201 and passes through the transverse sliding groove 208 along its longitudinal direction. The first end of the threaded rod 205 is confined to the first end of the frame 201. The second end of the threaded rod 205 is provided with a knob located on the outside of the frame 201. The sliding end 2041 of the second clamping member 204 is defined with a threaded hole 2042, and the threaded rod 205 is threadedly engaged with the threaded hole 2042. Rotating the knob of the threaded rod 205 drives the second clamping member 204 to move along the longitudinal direction of the transverse sliding groove 208, allowing the second clamping member 204 to selectively move closer to/away from the first clamping member 203.

As shown in FIG. 3 and FIG. 5, in some embodiments, the first clamping member 203 is provided with a first pad 206 on one side facing the second clamping member 204, and the second clamping member 204 is provided with a second pad 207 on one side facing the first clamping member 203. In some embodiments, the first pad 206 and the second pad 207 are silicone pads. Besides their anti-slip function, the silicone pads also provide cushioning and protection to prevent damage to the pool. Additionally, in some embodiments, as shown in FIG. 5, the second pad 207 has an arc-shaped cross-section. The arc-shaped second pad 207 can better fit a pool support structure such as a tubular structure.

Figure 8:
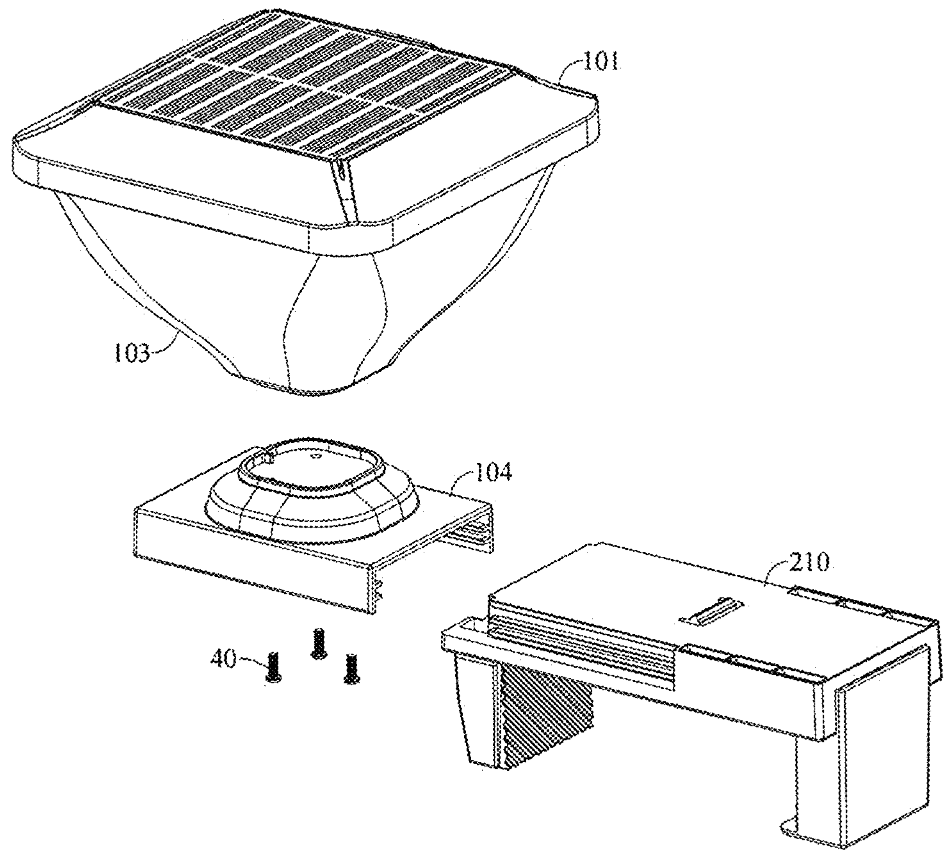
FIG. 8 is a perspective view of a bracket-type swimming pool light according to some embodiments of the present disclosure.
Figure 9:
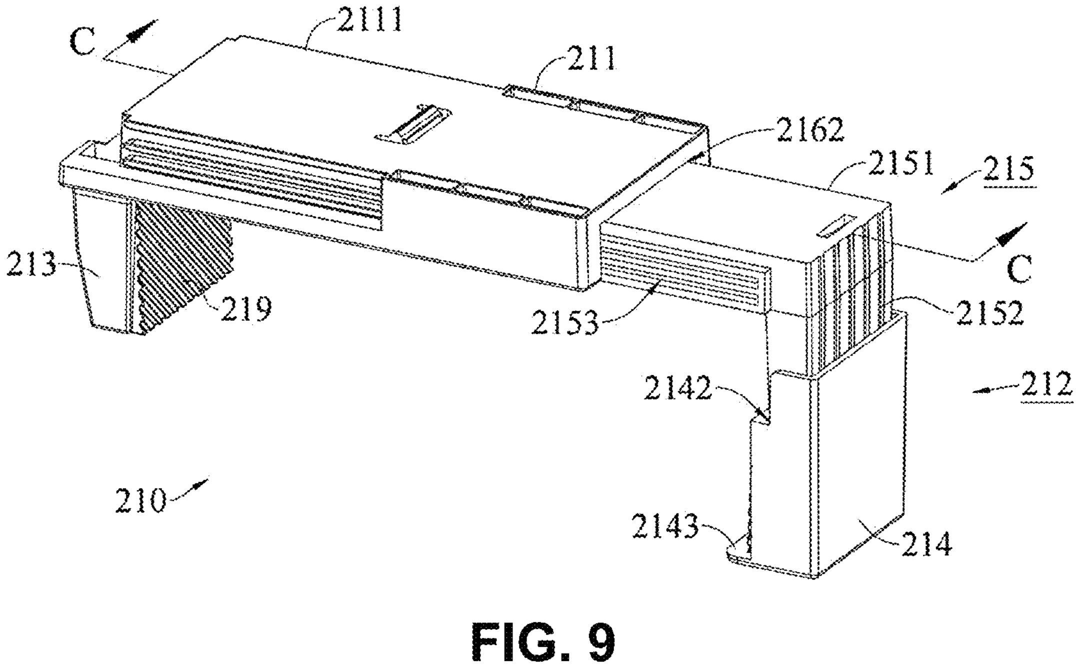
FIG. 9 is a perspective view of a second bracket assembly according to some embodiments of the present disclosure.
Figure 10:
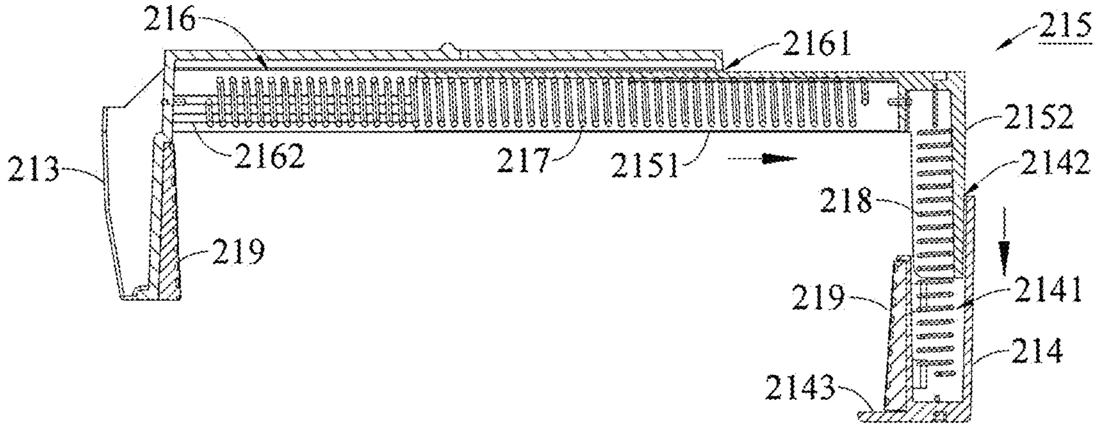
FIG. 10 is a cross-sectional view taken along line CC in FIG. 9.

As shown in FIG. 8 to FIG. 10, in some embodiments, the bracket assembly 20 includes a second bracket assembly 210. The second bracket assembly 210 includes an elongated frame 211. One end of the frame 211 includes a receiving portion 2111, which has the same structure as the receiving portion 2011 of the first bracket assembly 200, and will not be described again here.

The attachment structure of the second bracket assembly 210 includes a second clamping structure 212. The second clamping structure 212 includes a first clamping member 213 and a second clamping member 214. The first clamping member 213 is fixedly disposed at a first end of the frame 211 along its longitudinal direction, and the second clamping member 214 can selectively approach the first clamping member 213 along the longitudinal direction of the frame 211 to achieve a clamping function. In some embodiments, the frame 211 is defined with a transverse sliding groove 216, which extends along the longitudinal direction of the frame 211 to a second end of the frame 211. The second end of the frame 211 is defined with a first opening 2161 of the transverse sliding groove 216. The second clamping structure 212 also includes a sliding end 215, and the sliding end 215 includes a transverse sliding plate 2151. A first end of the transverse sliding plate 2151 can be inserted into the first opening 2161 of the transverse sliding groove 216 and slidably connected to the transverse sliding groove 216 along the longitudinal direction of the transverse sliding groove 216, allowing the frame 211 and the transverse sliding plate 2151 to form a telescopic structure. The second clamping member 214 is disposed at a second end of the transverse sliding plate 2151.

In embodiments of the present disclosure, a guide strip 2162 is provided on each of two opposing inner walls of the transverse sliding groove 216, extending along the longitudinal direction of the transverse sliding groove 216. The two opposing outer walls of the transverse sliding plate 2151 each define a guide groove 2153, extending along the extension/retraction direction of the transverse sliding plate 2151. The interaction between the guide grooves 2153 and the guide strips 2162 restricts the extension/retraction direction of the transverse sliding plate 2151.

As shown in FIG. 10, in order to maintain the clamping force of the second clamping structure 212, in some embodiments, the second clamping structure 212 further includes a first spring 217, with a first end connected to the first clamping member 213 and a second end connected to the second clamping member 214. The first spring is a tension spring; when the second clamping member 214 is pulled away from the first clamping member 213, the first spring 217 is stretched, accumulating elastic force. The second clamping structure 212 maintains the clamping force between the first clamping member 213 and the second clamping member 214 through the elastic force stored in the first spring 217.

To improve clamping stability, as shown in FIG. 9 and FIG. 10, in some embodiments, the second clamping member 214 has a vertical telescopic function. In some embodiments, the sliding end 215 has a vertical sliding plate 2152, which is located at the second end of the transverse sliding plate 2151 and extends in a direction perpendicular to the transverse sliding plate 2151. The second clamping member 214 defines a vertical groove 2141 extending in its vertical direction. The first end of the second clamping member 214 in the vertical direction defines a second opening 2142 in communication with the vertical groove 2141. The second end is provided with a retaining plate 2143. The retaining plate 2143 extends from the sidewall of the second clamping member 214 toward the first clamping member 213.

Figure 11:
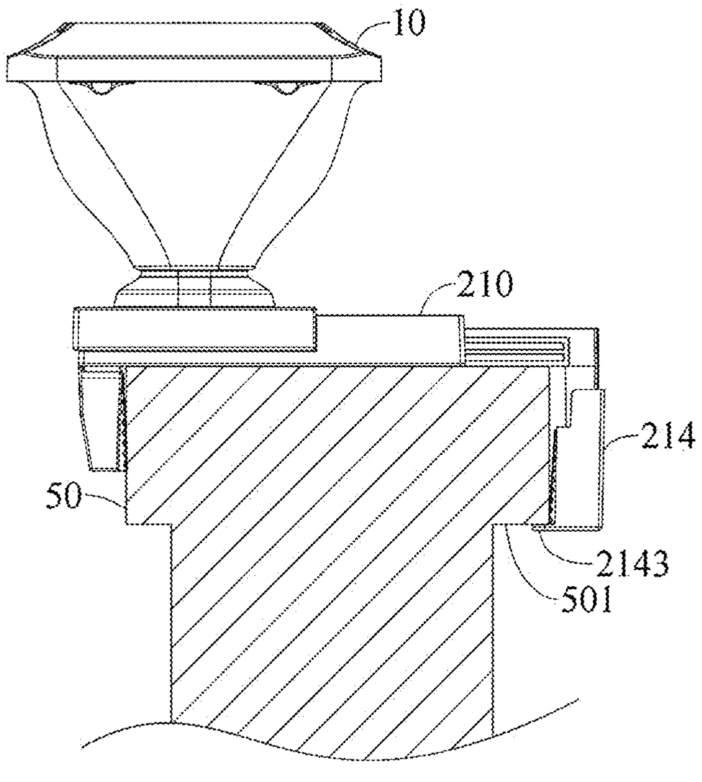
FIG. 11 is a perspective view of a bracket-type swimming pool light in a fixed state according to some embodiments of the present disclosure.

As shown in FIG. 10 and FIG. 11, to maintain the clamping force of the second clamping member 214, in some embodiments, the second clamping structure 212 further includes a second spring 218. A first end of the second spring 218 is connected to the second clamping member 214, and a second end of the second spring 218 is connected to the sliding end 215. When the second clamping member 214 moves away from the transverse sliding plate 2151, the second spring 218 is stretched, accumulating elastic force. The second clamping member 214 maintains the clamping force between itself and the transverse sliding plate 2151 through the elastic force accumulated by the second spring 218, thereby improving the stability of the second clamping assembly 214 installed on the swimming pool.

As shown in FIG. 9 and FIG. 10, in some embodiments, similar to the first clamping structure 202, the first clamping member 213 and the second clamping member 214 of the second clamping structure 212 each are provided with a pad 219. Their function is similar to that of the first clamping structure 202.

Figure 12:
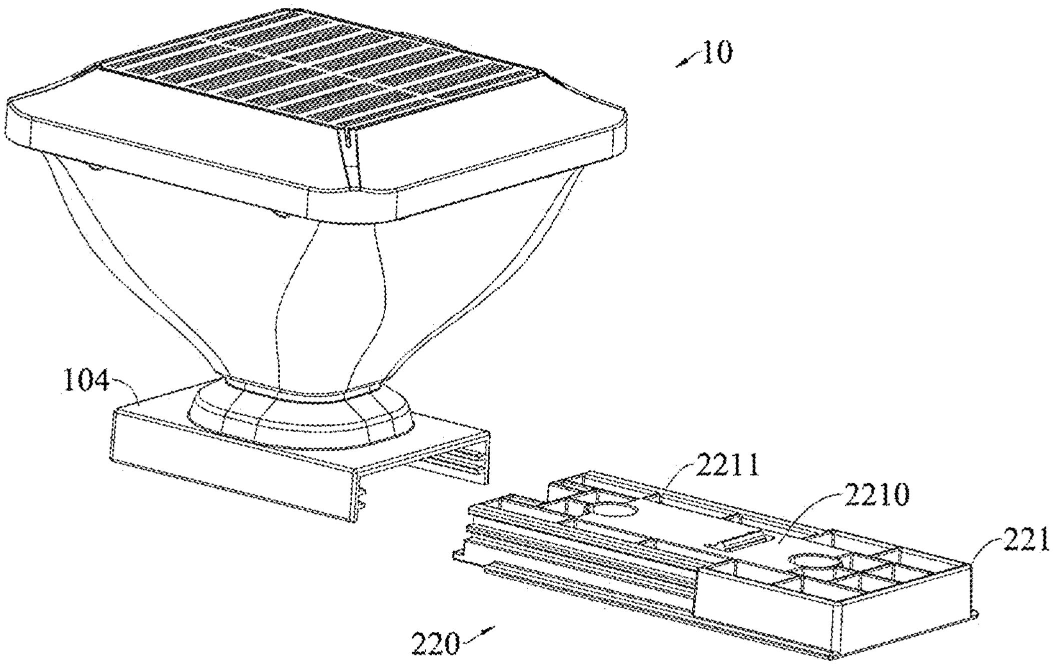
FIGS. 12 and 13 are perspective views of a third bracket assembly according to some embodiments of the present disclosure.
Figure 13:
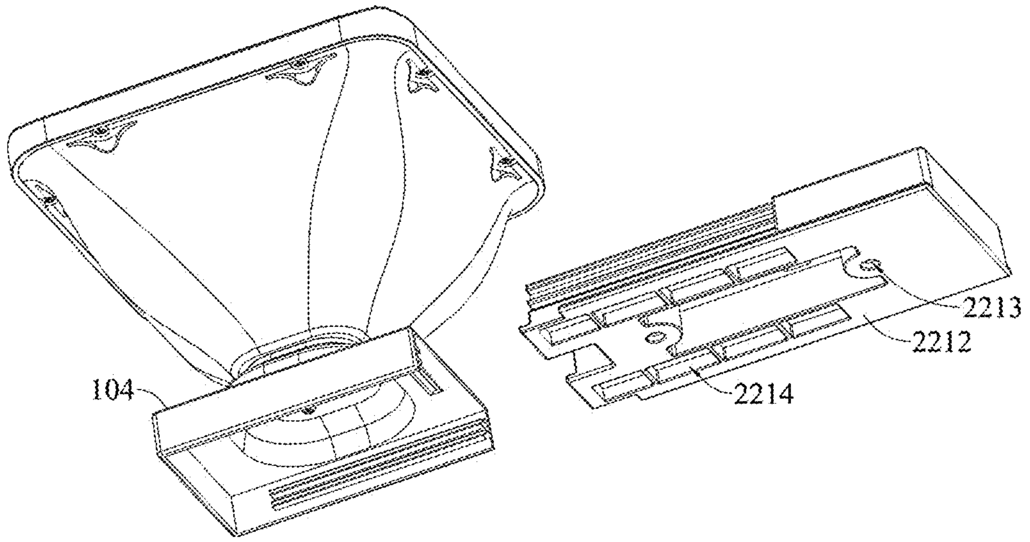

As shown in FIG. 12 and FIG. 13, in some embodiments, the bracket assembly 20 includes a third bracket assembly 220. The third bracket assembly 220 includes an elongated frame 221, which defines a first side surface 2210 and a second side surface 2212. The first side surface 2210 of the frame 221 is provided with a receiving portion 2211, which has the same structure as the receiving portion 2011 of the first bracket assembly 200, and will not be described again here. The attachment structure of the third bracket assembly 220 includes a surface connection structure, which is disposed on the second side surface 2212 of the frame 221. The frame 221 can be fixedly mounted on the surface of the carrier via the surface connection structure. The surface of the carrier includes edge surfaces of a swimming pool, the ground around the pool, the surface of an object next to the pool, etc., and is not specifically limited here.

The surface connection structure can be an adhesive connection structure. For example, adhesive can be applied to the second side surface 2212 of the frame 221, or double-sided tape can be pasted, and the third bracket assembly 220 is fixed to the surface of the carrier by adhesive.

The surface connection structure can also be an adsorption connection structure. For example, as shown in FIG. 13, the second side 2212 of the frame 221 defines a mounting hole 2213, and a fixed side of a suction cup is fixedly connected to the mounting hole 2213. The third bracket assembly 220 is adsorbed onto the surface of the carrier by the suction cup. Alternatively, the second side 2212 of the frame 211 defines a mounting groove 2214, and a magnet is placed in the mounting groove 2214. The third bracket assembly 220 is adsorbed onto the surface of the carrier by the magnet.

The present disclosure also provides some application scenarios as follows.

Figure 14:
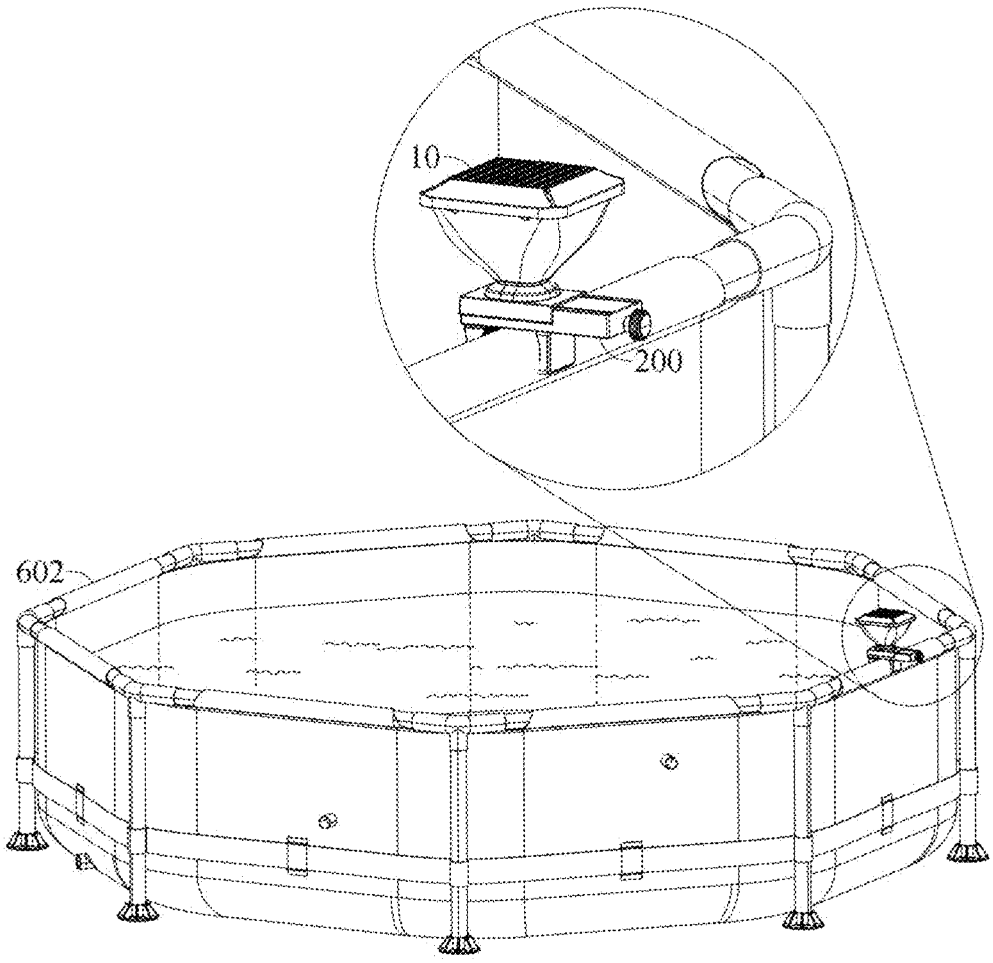
FIGS. 14 to 16 are perspective views of three application scenarios according to some embodiments of the present disclosure.
Figure 15:
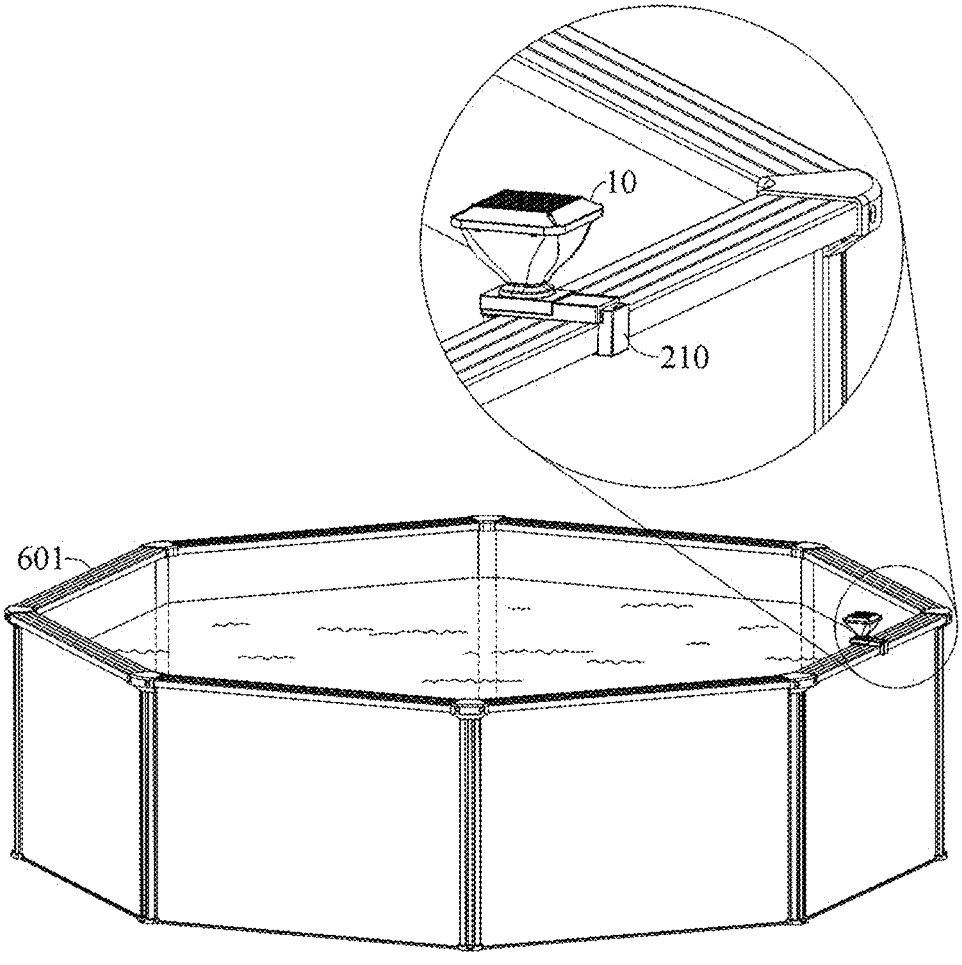
Figure 16:
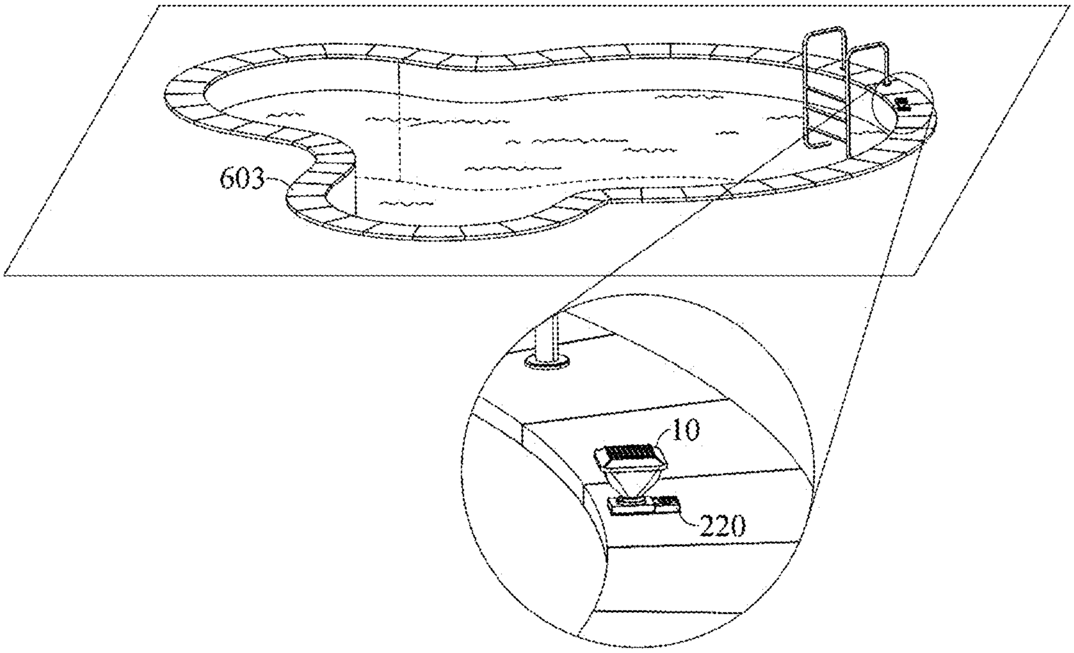

As shown in FIG. 14, a bracket-type swimming pool light with a first bracket assembly 200 is installed on one type of above-ground pool 602. As shown in FIG. 15, a bracket-type swimming pool light with a second bracket assembly 210 is installed on a steel pool 601. As shown in FIG. 16, a bracket-type swimming pool light with a third bracket assembly 220 is installed on an inground pool 603. The above application scenarios are for illustrative purposes only and do not constitute specific limitations.

The above descriptions are merely some embodiments of the present disclosure and are not intended to limit the present disclosure. Various modifications and changes may be made to the present disclosure by those skilled in the art. Any modifications, equivalent substitutions, improvements, etc., made within the spirit and principles of the present disclosure shall fall within the scope of protection of the present disclosure.

The invention claimed is:

1. A bracket-type swimming pool light comprising:

a lamp head assembly comprising a housing which is at least partially light-transmitting, wherein the housing is provided with a circuit board, at least one light-emitting element, and a battery; the at least one light-emitting element and the battery are electrically connected to the circuit board;

a bracket assembly being detachable and connectable to the lamp head assembly, the bracket assembly comprising an attachment structure configured to secure the bracket-type swimming pool light to a carrier;

wherein the circuit board is provided with a lamp panel, the at least one of the light-emitting elements is distributed on an outer wall of the lamp panel; and wherein the lamp panel is cylindrical.

2. The bracket-type swimming pool light according to claim 1, wherein a lampshade is sleeved on an outside of the lamp panel, and the lampshade is configured to adjust a light emission effect.

3. The bracket-type swimming pool light according to claim 2, wherein the housing comprises a bottom housing and a top housing, one end of the bottom housing defines a chamber with an opening, the top housing is configured to close the opening to form a sealed space within the chamber; the circuit board is fixedly connected to the top housing, and the lamp panel extends within the chamber towards the bottom housing.

4. The bracket-type swimming pool light according to claim 3, wherein the circuit board is electrically connected to a button, and the button is disposed on the top housing.

5. The bracket-type swimming pool light according to claim 3, the lamp head assembly further comprises an inner housing, the inner housing divides the sealed space into at least two regions, the at least two regions comprises a first region and a second region, the circuit board and the battery are disposed in the first region, the lamp panel extends through the inner housing and extends from the first region to the second region, and the lampshade is disposed on the inner housing and extends into the second region.

6. The bracket-type swimming pool light according to claim 1, wherein a solar panel is provided on the housing, the solar panel is electrically connected to the circuit board; the circuit board is configured to obtain electrical energy from the solar panel to charge the battery.

7. The bracket-type swimming pool light according to claim 1, wherein the bracket assembly comprises a frame, the frame is provided with a receiving portion; the housing is provided with a base, the base is detachably connected to the receiving portion; the attachment structure is provided on the frame.

8. The bracket-type swimming pool light according to claim 7, wherein the attachment structure comprises a clamping structure, the clamping structure comprises a first clamping member and a second clamping member, the first clamping member and the second clamping member are configured to move toward each other.

9. The bracket-type swimming pool light according to according to claim 8, wherein the first clamping member is fixedly disposed at a first end of the frame, the frame is defined with a transverse sliding groove, the transverse sliding groove extends from the first end of the frame to a second end of the frame; a sliding end of the second clamping member is slidably connected to the transverse sliding groove along a longitudinal direction of the transverse sliding groove.

10. The bracket-type swimming pool light according to according to claim 9, wherein a threaded rod is provided on the frame, and the threaded rod extends along the longitudinal direction of the transverse sliding groove; the sliding end of the second clamping member is defined with a threaded hole, the threaded rod is threadedly engaged with the threaded hole, and the threaded rod is configured to rotate to drive the second clamping member to move along the longitudinal direction of the transverse sliding groove to allow the second clamping member to move toward or away from the first clamping member.

11. The bracket-type swimming pool light according to claim 8, wherein a second end of the second clamping member is provided with a retaining plate, and the retaining plate extends from a side wall of the second clamping member toward the first clamping member.

12. The bracket-type swimming pool light according to claim 8, wherein the first clamping member and/or the second clamping member each are provided with a gasket.

13. The bracket-type swimming pool light according to claim 7, wherein the attachment structure comprises a surface connection structure, the frame comprises a first side surface and a second side surface, the receiving portion is disposed on the first side surface, the surface connection structure is fixedly disposed on the second side surface, and the surface connection structure is configured to be fixed to a surface of the carrier by adhesive or adsorption.

14. A bracket-type swimming pool light comprising:

a lamp head assembly comprising a housing which is at least partially light-transmitting, wherein the housing is provided with a circuit board, at least one light-emitting element, and a battery; the at least one light-emitting element and the battery are electrically connected to the circuit board;

a bracket assembly being detachable and connectable to the lamp head assembly, the bracket assembly comprising an attachment structure configured to secure the bracket-type swimming pool light to a carrier;

wherein the circuit board is provided with a lamp panel, the at least one of the light-emitting elements is distributed on an outer wall of the lamp panel; and wherein a lampshade is sleeved on an outside of the lamp panel, and the lampshade is configured to adjust a light emission effect; and wherein the lampshade is tubular.

15. A bracket-type swimming pool light comprising:

a lamp head assembly comprising a housing which is at least partially light-transmitting, wherein the housing is provided with a circuit board, at least one light-emitting element, and a battery; the at least one light-emitting element and the battery are electrically connected to the circuit board;

a bracket assembly being detachable and connectable to the lamp head assembly, the bracket assembly comprising an attachment structure configured to secure the bracket-type swimming pool light to a carrier;

wherein the bracket assembly comprises a frame, the attachment structure is provided on the frame;

wherein the attachment structure comprises a clamping structure, the clamping structure comprises a first clamping member and a second clamping member, the first clamping member and the second clamping member are configured to move toward each other;

wherein the first clamping member is fixedly disposed at a first end of the frame, the frame is defined with a transverse sliding groove, the transverse sliding groove extends from the first end of the frame to a second end of the frame; a sliding end of the second clamping member is slidably connected to the transverse sliding groove along a longitudinal direction of the transverse sliding groove; and wherein the second end of the frame is defined with a first opening in communication with the transverse sliding groove; the sliding end of the second clamping member comprises a transverse sliding plate; a first end of the transverse sliding plate is configured to be inserted into the first opening to form a telescopic structure with the frame; the second clamping member is disposed at a second end of the transverse sliding plate.

16. The bracket-type swimming pool light according to claim 15, wherein the second end of the transverse sliding plate is provided with a vertical sliding plate; the second clamping member is provided with a vertical groove; a first end of the second clamping member is defined with a second opening in communication with the vertical groove; the vertical sliding plate is configured to be inserted into the second opening of the vertical groove to form a vertical telescopic structure with the second clamping member.

17. The bracket-type swimming pool light according to claim 16, wherein the vertical telescopic structure further comprises a second spring; the second spring is configured to act on the second clamping member; the vertical telescopic structure is configured to maintain a clamping force between the second clamping member and the transverse sliding plate by an elastic force of the second spring.

18. The bracket-type swimming pool light according to claim 15, wherein the clamping structure further comprises a first spring, the first spring is configured to act on the second clamping member, and the clamping structure is configured to maintain a clamping force between the first clamping member and the second clamping member by an elastic force of the first spring.

* * * * *